Dec. 16, 1969   R. J. ROMAN ETAL   3,484,159
ADJUSTABLE LENS SYSTEM FOR A MOTION PICTURE PROJECTOR
Filed Aug. 10, 1967   3 Sheets-Sheet 1
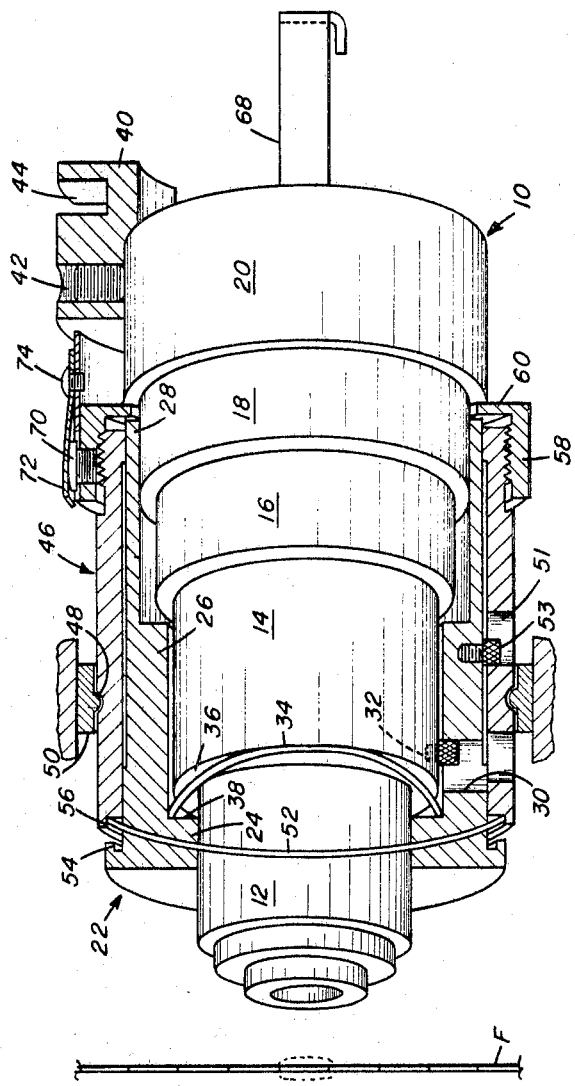
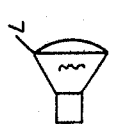
ROBERT J. ROMAN
MILES C. O'DONNELL
ROBERT B. JOHNSON
INVENTORS
BY
ATTORNEYS

ROBERT J. ROMAN
MILES C. O'DONNELL
ROBERT B. JOHNSON
INVENTORS

BY

ATTORNEYS

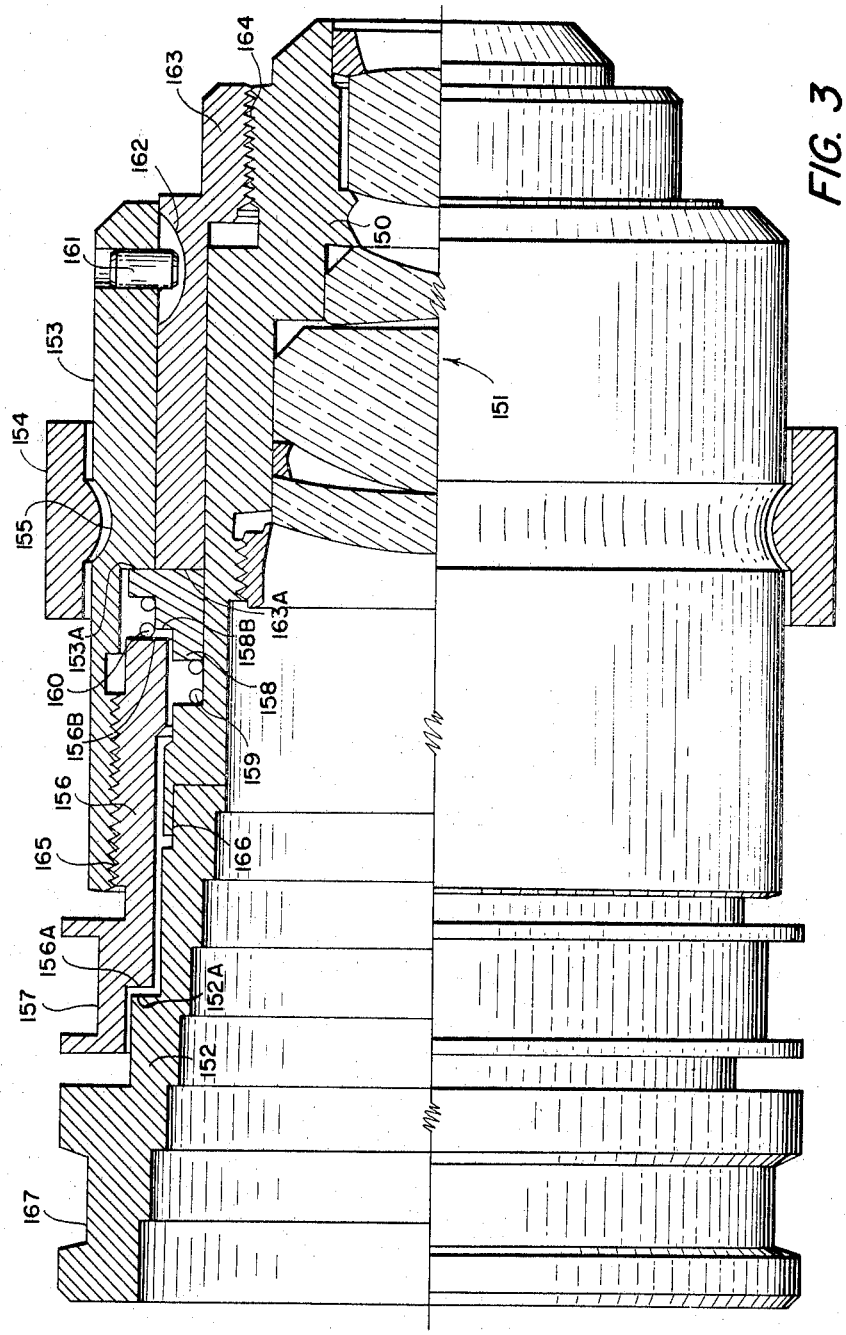

United States Patent Office 3,484,159
Patented Dec. 16, 1969

3,484,159
ADJUSTABLE LENS SYSTEM FOR A MOTION PICTURE PROJECTOR
Robert J. Roman, Miles C. O'Donnell, and Robert B. Johnson, Rochester, N.Y., assignors to Eastman Kodak Company, Rochester, N.Y., a corporation of New Jersey
Continuation-in-part of application Ser. No. 590,066, Oct. 27, 1966. This application Aug. 10, 1967, Ser. No. 659,717
Int. Cl. G03b 3/00, 21/00, 21/14
U.S. Cl. 352—140        16 Claims

ABSTRACT OF THE DISCLOSURE

A projector lens is separately adjustable for motion and still projection, and can be preset for remotely controlled actuation to the preset motion and still focus positions. The still focus adjustment can be toward or away from the film so as to provide for buckling of the film in either direction during still projection. A direction selector presets the direction of focus adjustment, and an adjustable abutment member presets the extent of focus adjustment. Appropriate focus adjustment can be automatic in accordance with changes in projector operation.

RELATED APPLICATIONS

This application is a continuation-in-part of commonly assigned copending application Ser. No. 590,066, filed Oct. 27, 1966, by Robert J. Roman et al., now abandoned. The subject matter of this application is particularly suitable for use in a motion picture projector of the type disclosed in commonly assigned copending application Ser. No. 590,067, filed Oct. 20, 1967, by M. C. O'Donnell et al., and the disclosure thereof is incorporated herein by reference as exemplary of a complete projector system with which the instant invention advantageously may be used.

This invention relates to projector lenses and more particularly to an improved lens system for a motion picture projector.

Some currently available motion picture projectors are capable of variable speed projection and still projection and may be selectively adjusted by the operator for a desired mode of operation. For example in application Ser. No. 371,938, filed on June 2, 1964 (now U.S. Patent No. 3,261,654 of July 19, 1966) by Richard L. Faber and assigned to the same assignee as the present invention, there is disclosed a skip frame projector which can be selectively adjusted for motion projection at 54, 18 and 6 frames per second or still projection.

During still projection the projected frame of the film is heated to relatively high temperatures since it remains in front of the lamp for a substantial period of time as compared to motion projection. As a result, buckling of the frame occurs, causing displacement of the center portion of the frame relative to the projector lens and an out-of-focus condition. To compensate for this condition, in many currently available projectors it is necessary for the operator to focus the projector during still projection and then to refocus when the projector is returned to motion projection. Such repeated focusing operations tend to confuse and discourage the inexperienced operator and are tiresome to the experienced operator.

Another factor which renders the still focusing operation confusing is the variation in direction of buckling with different types of film. Depending upon the structure of the film, buckling may occur toward or away from the lens, which must be moved a corresponding distance forward or backward during still focusing.

It is a principal object of the present invention to provide an improved adjustable lens system for a motion picture projector which can be more conveniently adjusted for still and motion projection.

Another object of the invention is to provide an adjustable lens system for a motion picture projector which can be adjusted to establish preset motion and still focus positions for any particular film regardless of the direction or extent of film buckle.

In a remotely controlled motion picture projector system such as the type disclosed in said copending application Ser. No. 590,067, means are provided for remotely controlling various projector functions including motion and still projection. Another more specific object of this invention is to provide a lens system which can be remotely focused during still projection to compensate for film buckle.

The above and other objects and advantages will become apparent from the following description of exemplary preferred embodiments taken in connection with the accompanying drawings wherein:

FIG. 1 is a perspective view in partial section of a lens structure in accordance with the present invention.

FIG. 3 is a partially sectioned view of a second and preferred embodiment of a lens structure in accordance with the invention, the control linkages being omitted for clarity.

Figure 2:
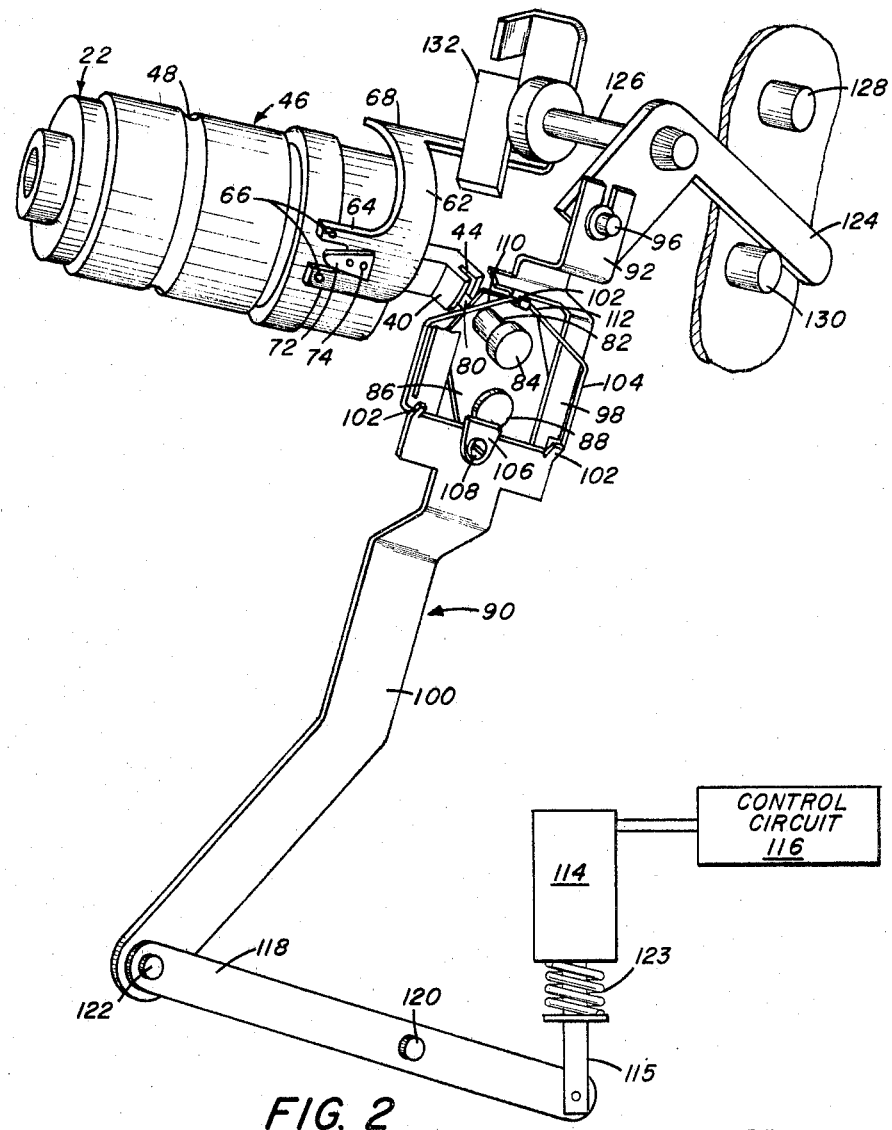
FIG. 2 is a perspective view of the structure shown in FIG. 1 and the linkage for effecting still focus adjustment.

Referring to FIG. 1 of the drawings there is shown a generally cylindrical lens housing or barrel identified generally by the reference numeral 10 and comprising consecutive cylindrical portions 12, 14, 16, 18 and 20 which increase in diameter from left to right as viewed in FIG. 1. The barrel 10 contains an optical lens system and is adapted to be supported by the parts later to be described on a projector housing (not shown) with its longitudinal axis perpendicular to the plane of a film F and in alignment with a projector lamp L. The optical system within the barrel 10 is of a form well known to those skilled in the art, such as shown generally in FIG. 3, and a specific showing and description thereof is deemed to be unnecessary.

The lens barrel 10 is slidably mounted in a housing comprising a sleeve 22 having sleeve portions 24, 26 and 28 of diameters complemental to portions 12, 14 and 18 of barrel 10. The lens barrel 10 is arranged to be moved axially relative to sleeve 22 during still focusing as will later be described. To facilitate and limit such relative movement the sleeve 22 is provided with an elongated slot 30 adapted to slidably receive the head of a screw 32 threaded in lens barrel portion 14. The width of slot 30 is preferably complemental to the diameter of screw 32 to prevent rotation of the lens barrel 10 in sleeve 22. The lens barrel 10 is thus movable relative to sleeve 22 between positions determined by engagement of screw 32 with opposite ends of slot 30. An adjustable stop means later to be described is effective to limit such movement to the distance required to achieve still focusing for a particular film.

A biasing means comprising a spring 34 is provided for biasing the lens barrel 10 to the position shown in FIG. 1 wherein the screw 32 engages the right end of slot 30. The spring 34 comprises a circular wire segment bent across one diameter to have a relaxed configuration defining two intersecting planes and is mounted in compression between juxtaposed shoulder surfaces 36 and 38 of barrel portion 14 and sleeve portion 24.

A barrel positioning lug 40 is fixedly attached to the barrel portion 20 by a screw 42. The lug 40 is provided with a groove 44 adapted to receive the actuating means later to be described for positioning the barrel 10 with and relative to the sleeve 22.

The sleeve 22 is slidably received in a housing comprising a second or adaptor sleeve 46 which permits axial displacement of sleeve 22 and lens barrel 10 as a unit relative to the projector housing during still focusing to compensate for film buckle in a direction away from the lens system as will later be described in more detail. The sleeve 46 is adapted to be movably supported on the projector housing and may be provided with a peripheral groove 48 adapted to be engaged by a suitable circular support 50 of the projector housing as diagrammatically indicated in FIG. 1. Preferably, the support 50 is part of or is controlled by the usual manual focus control of the projector, and movable relative to the film plane whereby the sleeve 46 and the assembly contained therein can be moved axially relative to the film plane to focus the lens system for motion projection, as is well known in the art.

The maximum range of movement of the assembly comprising lens barrel 10 and sleeve 22 relative to the sleeve 46 is determined by a slot 51 in sleeve 46. The head of a screw 53 threaded in sleeve 22 is slidably received in slot 51 and has a diameter complemental to the slot width. It will be apparent that the assembly comprising barrel 10 and sleeve 22 is movable between positions wherein the screw 53 engages the ends of the slot 51.

The assembly comprising barrel 10 and sleeve 22 is biased to the position shown wherein screw 53 engages the left end of slot 51 by a biasing means comprising a spring 52 mounted in compression between sleeve 46 and sleeve 22. The spring 52 encircles sleeve 22 as shown and is retained by annular recesses 54 and 56 formed in juxtaposed shoulder surfaces of sleeves 22 and 46 respectively.

Adjustable abutment or limiter means are provided between juxtaposed spaced surfaces of sleeve 22 and lens barrel 10 for selectively varying the range of movement of the assembly comprising sleeve 22 and lens barrel 10 relative to sleeve 46, and of lens barrel 10 relative to sleeve 22. This means comprises a ring 58 threaded on the right end of sleeve 46 and defining an inwardly extending radial flange 60 positioned between the end of sleeve 22 and the end of barrel portion 20. The flange 60 defines a stop adapted to be engaged by sleeve 22 upon movement of the assembly comprising lens barrel 10 and sleeve 22 to the right as viewed in FIG. 1 and a stop adapted to be engaged by barrel portion 20 upon movement of the barrel 10 to the left relative to sleeve 22. By rotating ring 58 the flange 60 can be selectively positioned relative to the end of sleeve 22 or the end of barrel portion 20 to limit the extent of movement of the assembly comprising sleeve 22 and lens barrel 10 within the range permitted by slot 51 and screw 53 or to limit the extent of movement of the barrel 10 relative to the sleeve 22 in the range permitted by slot 30 and screw 32. The flange 60 can thus be effectively adjusted to predetermine or preset the extent of displacement of the lens barrel 10 to either the right or left from the position shown in FIG. 1.

To facilitate rotation of ring 58 from a position to the rear of the lens system depicted in FIG. 1 an operating lever 62 (see FIG. 2) has a forked end portion 64 attached to ring 58 by screws 66 as shown more clearly in FIG. 2 of the drawing. The lever 62 includes an offset arm portion 68 extending from the lens system which may be positioned by the operator to rotate the ring 58.

To prevent nonintentional rotation of ring 58 a bushing 70 is slidably received in a suitable bore in the wall of ring 58 and is biased into engagement with the threaded portion of sleeve 46 by a leaf spring 72 one end of which is fixed to lever portion 64 by a rivet 74. The spring 72 is effective to establish a frictional force between the end of bushing 70 and the threads on sleeve 46 to prevent undesired rotation of the ring 58.

Considering now the function of the structure thus far described, as previously mentioned the entire assembly comprising sleeve 46, sleeve 22 and lens barrel 10 is adapted to be displaced axially relative to the projector housing and the plane of the film by a conventional focus control to establish a focus condition for motion projection. This adjustment is initially effected at the beginning of a particular film and need not be changed. Thus, it can be assumed that the position of sleeve 46 is fixed during the showing of a particular film.

During still projection the film will buckle either toward or away from the lens barrel 10 depending on the construction thereof and will assume one of the exaggerated configurations indicated schematically by the dashed lines in FIG. 1. If the film buckles away from the lens barrel 10 it is necessary to displace the lens barrel 10 a corresponding distance to the left as viewed in FIG. 1. Movement of barrel 10 is effected by application of a displacing force to positioning lug 40. Sleeve 22 will not be displaced since screw 53 engages the left end of slot 51, and lens barrel 10 will be displaced relative to both sleeve 22 and sleeve 46 against the bias of spring 34.

On the other hand, if the film construction is such that the film buckles towards the lens barrel, an actuating force is applied to positioning lug 40 to cause movement of the lens barrel 10 to the right to achieve still focus. Since screw 32 engages the right end of slot 30 the sleeve 22 and lens barrel 10 will be displaced as a unit relative to sleeve 46.

If ring 58 were not provided the length dimension of slot 30 would determine the maximum range of movement of the barrel 10 to the left relative to sleeve 22 and the length dimension of slot 51 would determine the maximum range of movement of the assembly comprising barrel 10 and sleeve 22 to the right relative to sleeve 46, respectively. The adjustable stop means comprising ring 58 can be adjusted to limit movement in either direction to the exact focus compensation required for a particular film being projected. More specifically if a film to be projected buckles to the left or away from the lens assembly, ring 58 can be rotated to position flange 60 to be engaged by barrel portion 20 of lens barrel 10 in the position where compensation or still focus is achieved. Similarly if the film to be projected buckles to the right or towards the lens assembly, the ring 58 can be rotated to position flange 60 to be engaged by the end of sleeve 22 in the position where compensation or still focus is achieved.

The individual frames of a particular film exhibit substantially identical buckling characteristics, and generally it is only necessary to adjust ring 58 at the beginning of the film. Such adjustment is made subsequent to the motion focus adjustment previously described by effecting still projection of one frame and then adjusting ring 58 to obtain the proper stop position of flange 60.

Referring now to FIG. 2 and the actuating means for positioning lug 40 to achieve still focus, one end 80 of an actuating pin 82 is positioned in groove 44 of lug 40 to transmit an actuating force to the latter when still focus is required. The pin 82 is provided with a flange 84 on the other end thereof and is fixed to one end of a lever plate 86, the other end of which is pivoted on the projector housing by means of a pivot pin 88. The actuating pin 82 is thus movable through an arcuate path about the pivot point of lever plate 86.

The end 80 of pin 82 has a diameter complemental to the width of groove 44 to prevent movement of the pin laterally of the groove. The length of groove 44 is sufficient to permit limited displacement of pin 82 along the groove during arcuate movement of pin 82.

An operating lever 90 is effective to position pin 84 about the pivot point of lever plate 86. More specifically the lever 90 comprises a slotted end portion 92 slidably received by a pin 96, an O-shaped portion 98 surrounding the pin 82 and lever 86, and an actuating arm 100 depending from portion 98. The O-shaped portion is provided with three integral spring retaining tabs 102 positioned in a triangular pattern as shown for retaining a wire spring 104. A clamp 106 attached to lever portion 98 by a screw 108 serves to clamp the base portion the spring 104 to the lever portion 98 to insure retention thereof. As will later be described in more detail, segments 110 and 112 of spring 104 are shaped and positioned to selectively engage the pin 82 upon downward displacement of lever 90.

The operating lever 90 is adapted to be displaced downwardly to effect positioning of lug 40 in the direction necessary to achieve still focus. While such displacement of the lever 90 may be effected manually, it is preferred to position lever 90 by means of a remotely controlled solenoid 114, energization of which may be controlled by switch means in a control circuit 116 for a projector system. Such a control circuit may take the form of that disclosed in said copending application Ser. No. 590,067.

The operating plunger 115 of solenoid 114 is operatively connected to one end of a lever 118 adapted to be pivotally supported on the projector housing by means of a pivot pin 120. The other end of lever 118 is operatively connected to the end of lever arm 100 by a pin 122. A spring 123 biases the plunger 115, lever 118 and lever 90 to the positions shown in FIG. 2. The solenoid 114 is effective upon energization to displace plunger 115 upward and rotate lever 118 about pin 120 thereby to effect downward displacement of operating lever 90 from the position shown in FIG. 2 and effect selective positioning of lug 40 in the manner now to be described.

The pin 96 receiving the slotted end portion 92 of lever 90 is mounted on one end of an L-shaped shift lever 124 which in turn is fixed to one end of a rotatable shaft 126. The lever 124 is adapted to selectively engage two stops 128 and 130 fixed to the projector housing to establish two operative positions of pin 96. A manual selector lever 132 is attached to the end of shaft 126 opposite from lever 124 for selectively positioning lever 124 into engagement with stop 128 or stop 130.

Referring now to the operation of the linkage system disclosed in FIG. 2, it will be noted that in the position of the parts shown wherein lever 124 engages stop 130 the inclined segment 112 of spring 104 will be positioned above pin 82 in close proximity thereto. If lever 90 is displaced downward by energization of solenoid 114 segment 112 of spring 104 will engage pin 82. The inclination of spring segment 112 relative to the axis of lens barrel 10 is such as to produce a force component in the direction of said axis tending to displace pin 82 to the left. The engagement of spring segment 112 with pin 82 will accordingly displace the assembly comprising lens barrel 10, lug 40 and pin 82 to the left until barrel portion 20 engages flange 60.

If the lever 124 is positioned in engagement with stop 128 the slotted end portion 92 of lever 90 will be displaced to the right to position segment 110 of spring 104 over pin 82. In this position of lever 124 downward displacement of lever 90 will cause spring segment 110 to engage pin 82. The inclination of segment 110 relative to the axis of lens barrel 10 will produce a force component in the direction of said axis tending to displace pin 82 to the right. The assembly comprising barrel 10, sleeve 22, lug 40 and pin 82 will accordingly be positioned to the right until the portion 28 of sleeve 22 engages flange 60.

It will be thus apparent that the direction of movement of lens barrel 10 to achieve still focusing can be selectively varied by selectively positioning lever 124 in engagement with one of the fixed stops 128 and 130. When lever 124 engages stop 130 as shown focus compensation for film buckle away from the lens assembly occurs. When lever 124 engages stop 128 focus compensation for film buckle in the opposite direction occurs. The direction of compensation is selected by positioning selector lever 132 in accordance with the direction of buckle of the film to be projected. Ring 58 is adjusted as previously described at the beginning of the film to establish the extent of focus compensation during still projection.

The resiliency of spring 104 permits substantial override movement of the lever 90 relative to pin 82. Thus the stroke of lever 90 can be constant regardless of the position of ring 58, the difference in displacement being compensated for by yielding of spring 104.

It will also be apparent that when de-energization of solenoid 114 occurs after a period of still projection, the lens barrel 10 or lens barrel and sleeve 22 will be returned to the positions shown in FIG. 1 by a biasing force exerted by springs 34 and 52. Thus the parts are automatically returned to their motion focus positions without adjustment by the operator.

Considering now the embodiment of the invention shown in FIG. 3, this embodiment is substantially identical in function, capabilities, and manner of operation to the embodiment shown in FIG. 1. However, the embodiment of FIG. 3 is the presently preferred embodiment primarily because of fabrication and assembly considerations. The control arrangement for effecting adjustment to still focus positions is not shown in FIG. 3, but it will be clear that the control arrangement shown in FIG. 2 is fully applicable to the embodiment of FIG. 3.

As shown in FIG. 3, lens housing sleeve 150 is a rather conventional projector lens barrel assembly with its lens elements shown generally at 151. Either threaded or cemented to one end of the lens housing sleeve 150 at 166 is a control sleeve 152 which constitutes an integral part of the overall lens housing sleeve assembly. Control sleeve 152 is formed in any suitable manner at 167 for connection to an adjusting linkage arrangement for effecting axial adjustment of the combined control sleeve and lens housing sleeve. A positioning lug such as is shown at 40 in FIG. 1 could appropriately be mounted at 167 as part of the adjusting linkage.

Adaptor supporting sleeve 153, which corresponds to sleeve 46 in the embodiment of FIG. 1, holds the entire assembly in the projector. As in the embodiment of FIG. 1, the focus control of the projector (schematically indicated at 154) picks up the groove 155 in adaptor supporting sleeve 153 for manual focus of the projector lens in the normal manner. As in the embodiment of FIG. 1, sleeve 153 is, of course, adapted to be mounted for focusing movement relative to the projector proper.

Limiter sleeve 156 (corresponding to the adjustable abutment means 58 of FIG. 1) is threaded to supporting sleeve 153 at 165 for its support. Limiter sleeve 156 is suitably formed at 157 for connection to a rotatable adjustment lever such as shown at 62 and 68 in FIG. 2 for adjusting limiter sleeve 156 to establish the distance the lens housing sleeve 150 must move to correct for film buckle of the particular length of film. The abutment surfaces which establish these distances in the respective directions of adjustment of sleeve 156 are shown at 156A and 156B.

Adaptor sleeve 163 is threaded on and cemented to lens housing sleeve 150 at 164, and includes a slot 162 which receives the end of a lock pin 161 to prevent relative rotation between adaptor supporting sleeve 153 and the combined lens housing assembly consisting of sleeve 150, adaptor sleeve 163, and control sleeve 152. Slot 162 is elongated, however, so as to permit relative axial movement between supporting sleeve 153 and this lens housing assembly. Thus the integral assembly of sleeves 163, 150 and 152 is slidably mounted inside adaptor supporting sleeve 153 for axial adjustment relative thereto.

Slidably mounted between supporting sleeve 153 and lens housing sleeve 150 is a ring or similar annular member 158. Coil compression springs 159 and 160 bear against ring 158 and repectively against a shoulder formed in lens housing sleeve 150 and surface 156B of the limiter sleeve 156. These springs thus bias the ring 158 toward the right as viewed in FIG. 3 so that it bears against shoulder 153A of supporting sleeve 153 and shoulder 163A of adaptor sleeve 163 during normal conditions when the lens housing assembly is not adjusted to compensate for film buckle. Thus there is established a definite normal relative axial relationship between supporting sleeve 153 and the lens housing assembly, which may be considered as the motion focus relationship. For subsequent compensating focus adjustment during still projection, the lens housing assembly 150, 163 and 152 may be moved to the right as viewed in FIG. 3 against the bias of coil spring 159 and relative to ring 158, which is prevented from moving to the right by shoulder 153A. During this movement shoulder 163A, of course, moves away from ring 158. During compensating focus adjustment to the left as viewed in FIG. 3, ring 158 is caused by shoulder 163A to move with the lens housing assembly away from shoulder 153A and against the bias of spring 160. In each instance, the lens housing assembly is returned to the relative axial position illustrated in FIG. 3 by the bias of springs 159 and 160, respectively, upon removal of the displacing or adjusting force.

For cooperating with the abutment surfaces 156A and 156B on limiter sleeve 156, opposed abutment surfaces are provided at 152A on the control sleeve 152 of the lens housing assembly and at 158B on the ring 158. During compensating focus adjustment, the limit of adjusting movement to the left is determined by the adjusted position of abutment surface 156B which abuts with surface 158B, and the limit of adjusting movement to the right is similarly determined by the adjusted position of abutment surface 156A which abuts with surface 152A. Thus, as in the embodiment of FIG. 1, the extent of compensating focus adjustment for still projection is set by the adjustment of limiter sleeve 156.

In operation, as the projector is shifted to still projection, the compensating focus relay or solenoid is energized, thus actuating the linkage which moves the lens housing assembly the necessary distance to correct for film buckle occurring in still projection. When the projector is returned to the motion projection mode, the relay or solenoid is de-energized, thus allowing the lens housing assembly to return to its original focus setting for motion projection.

As in the first embodiment, the position of limiter sleeve 156 is preset for each length of film as determined by the amount of buckling at the beginning of the length of film. As the film is started in motion projection, the manual focus is set by the conventional focus knob. Then the projector is shifted to still projection mode, and a noticeable focus shift due to film buckle will occur. Through the focus compensating control (62, 68, etc.) limiter sleeve 156 is positioned to establish proper still focus, thus nullifying the effect of buckle. As the projector is shifted back to motion mode the lens housing assembly will automatically go back to focus for motion projection. From then on, throughout the length of the film the lens housing assembly will automatically shift its position the necessary distance to compensate for the amount of buckle related to the particular film whenever the projector is shifted to still projection mode.

As previously mentioned, an important characteristic of the embodiment of FIG. 3 lies in the ease of fabrication and assembly. Thus, in assembling the embodiment of FIG. 3 spring 159 is placed in position over lens housing sleeve 150 (which is already integrally connected with control sleeve 152 at threaded or cemented joint 166), and limiter sleeve 156 is placed in position over lens housing sleeve 150 and control sleeve 152. Ring 158 and spring 160 are then placed in position, and adaptor sleeve 163 is threaded into position over lens housing sleeve 150 with cement applied to the threads at 164 before assembly. Adaptor sleeve 163 is tightened onto lens housing sleeve 150 to seat the shoulders or abutment surfaces, and is then backed off a predetermined amount to assure the focusing clearances. Finally, adaptor supporting sleeve 153 is threaded onto limiter sleeve 156, and lock pin 161 is inserted as shown, and secured.

Although we have shown and described exemplary and preferred embodiments of our invention, it will be apparent to those skilled in the art that many changes and modifications may be made without departing from the scope of the invention as defined in the appended claims.

We claim:

1. In a lens system for a motion picture projector adapted to selectively effect still and motion projection of a film strip, the combination comprising:
   a first housing member adapted to be mounted on the projector housing and to be moved relative thereto to effect motion focusing of the lens system;
   a second member slidably mounted inside said first member for movement relative thereto;
   a third housing member adapted to contain an optical lens system for the projector slidably mounted inside said second member for movement relative thereto;
   first abutment means associated with said first and second members to define a motion focus position of said second member relative to said first member and to limit movement of said second member in one direction relative to said first member;
   first means for biasing said second member to said motion focus position thereof;
   second abutment means associated with said second member and said third member to define a motion focus position of said third member relative to said second member and to limit movement of said third member relative to said second member in a direction opposite to said one direction;
   second means for biasing said third member to said motion focus position thereof; and
   means for selectively applying a displacing force to said third member in said opposite direction to effect movement of said third member and said second member as a unit relative to said first member against the biasing force of said first biasing means and in said one direction to effect movement of said third member relative to said first and second members against the biasing force of said second biasing means to effect selective positioning of the optical system in either of said directions during still projection.

2. In a lens system as claimed in claim 1 wherein said means for applying a displacing force to said third member comprises an electric solenoid having an operating plunger operative to be displaced in a predetermined direction upon energization of said solenoid, and means for selectively translating displacement of said operating plunger into a displacing force acting on said third member in said one direction and a displacing force acting on said third member in said opposite direction.

3. In a lens system for a motion picture projector adapted to selectively effect still and motion projection of a film strip, the combination comprising:
   a first supporting sleeve adapted to be mounted on the projector housing and to be moved axially relative thereto during motion focusing;
   a second annular member slidably mounted inside said first sleeve for axial movement relative thereto;
   a tubular housing adapted to contain an optical lens system for the projector slidably mounted inside said second annular member for axial movement relative thereto;
   first abutment means for limiting axial movement of said second annular member relative to said first sleeve in one direction to a predetermined motion focus position;
   first means for biasing said second annular member in said one direction to said motion focus position thereof;
   second abutment means for limiting axial movement of said tubular housing relative to said second annular member in a direction opposite to said one direction to a predetermined motion focus position;
   second means for biasing said tubular housing in said opposite direction to said motion focus position thereof; and means for selectively applying a displacing force to said tubular housing in said opposite direction to effect movement of said tubular housing and said second annular member as a unit relative to said first sleeve against the biasing force of said first biasing means, and in said one direction to effect movement of said tubular housing relative to said first sleeve and second annular member against the biasing force of said second biasing means to effect selective focusing of the optical system in either of said directions during still projection.

4. In a lens system as claimed in claim 3 wherein said first abutment means comprises a first elongated slot in said first sleeve and a first screw threaded in said second annular member and slidably received by said first slot, said first screw engaging one end of said first slot in said motion focus position of said second annular member.

5. In a lens system as claimed in claim 3 wherein said second abutment means comprises a second elongated slot in said second annular member and a second screw threaded in said tubular housing and slidably received by said second slot, said second screw engaging one end of said second slot in said motion focus position of said tubular housing.

6. In a lens system as claimed in claim 3 wherein said tubular housing and said second annular member define juxtaposed spaced surfaces in axially spaced relationship, and further including an adjustable stop member supported by said first sleeve between said juxtaposed surfaces to limit movement of said second annular member in said opposite direction and said tubular housing in said one direction.

7. In a lens system as claimed in claim 6 wherein said adjustable stop comprises a ring threaded to said first sleeve and having a flange positioned between said juxtaposed surfaces, said ring being rotatable to position said flange relative to said juxtaposed surfaces.

8. In a lens system as claimed in claim 7 wherein said means for applying a force to said tubular housing comprises:
 a positioning lug fixed to said tubular housing;
 an actuating pin positioned in engagement with said lug;
 a wire spring defining a pair of wire segments inclined in different directions with respect to the axis of said tubular housing; and
 lever means for selectively positioning said wire segments in engagement with said pin to selectively apply displacing forces to said tubular housing in said one direction and said opposite direction.

9. In a lens system as claimed in claim 8 further including a pivotal lever supporting said actuating pin for movement in an arcuate path.

10. In a lens system as claimed in claim 9 wherein said lever means includes an actuating lever for supporting said wire spring and adapted to be displaced in one direction to effect engagement of one of said wire segments with said pin and in a second direction to effect engagement of the other of said wire segments with said pin.

11. In a lens system as claimed in claim 10 further including a second lever movable between two positions; means on one end of said second lever slidably receiving one end of said actuating lever; means operative to apply a displacing force in a predetermined direction to the other end of said actuating lever; said second lever being operative in one of said positions to displace said actuating lever in said one direction and in the other of said positions to displace said actuating leved in said second direction.

12. In a lens system as claimed in claim 11 wherein said means for applying a displacing force to said other end of said actuating lever comprises an electric solenoid.

13. In a lens system for a motion projector adapted to selectively effect still and motion projection of a film strip, the combination comprising:
 a supporting sleeve adapted to be mounted on the projector housing for focusing movement axially relative thereto;
 a lens housing member slidably located in said supporting sleeve for axial movement relative thereto;
 an annular member slidably located between said supporting sleeve and said lens housing member for axial movement relative to said supporting sleeve and said lens housing member;
 respective abutment means for limiting relative movement of said annular member in one axial direction relative to said supporting sleeve and said lens housing member;
 respective resilient biasing means extending between said supporting sleeve and said annular member and between said lens housing member and said annular member for resiliently biasing said annular member relatively toward and into engagement with said respective abutment means to establish relative axial positions of said supporting sleeve, said lens housing member, and said annular member,
 whereby said supporting sleeve can be adjusted axially to establish a motion focus position for the entire assembly, and said lens housing member can be adjusted axially in either direction relative to said supporting sleeve and in opposition to at least one of said biasing means to a still focus position to compensate for film buckling during still projection.

14. Apparatus as claimed in claim 13 further comprising adjustable stop means for variably limiting the axial adjustment of said lens housing member relative to said supporting sleeve to predetermined limits selected for particular films, whereby to establish a predetermined still focus position of said lens housing member relative to said supporting sleeve.

15. Apparatus as claimed in claim 14 further comprising means for selectively applying an axial displacing force to said lens housing member to move said lens housing member to its predetermined still focus position relative to said supporting sleeve.

16. Apparatus ah claimed in claim 14 wherein said adjustable store means comprises a member threadably mounted on said supporting sleeve for axial movement relative thereto.

References Cited

UNITED STATES PATENTS

| | | | |
|---|---|---|---|
| 2,339,503 | 1/1944 | Miller | 352—140 |
| 2,887,937 | 5/1959 | Gebele | 95—45 |
| 2,994,258 | 8/1961 | Schafer et al. | 95—45 |
| 3,028,788 | 4/1962 | Zillmer | 353—69 |
| 3,205,766 | 9/1965 | Ewald et al. | 353—69 |
| 3,222,987 | 12/1965 | Wrigglesworth | 350—252 |

JULIA E. COINER, Primary Examiner

U.S. Cl. X.R.

95—45; 350—252; 353—69